United States Patent [19]

Nagai et al.

[11] Patent Number: 5,388,009
[45] Date of Patent: Feb. 7, 1995

[54] PCM SIGNAL RECORDING METHOD AND APPARATUS CAPABLE OF ADDING INDEX CODE TO PCM SIGNAL RECORDED AT DIFFERENT TRANSMISSION RATES

[75] Inventors: Yutaka Nagai; Toshifumi Takeuchi; Takao Arai; Hiroo Okamoto; Takaharu Noguchi, all of Yokohama; Shigeyuki Itoh, Kawasaki, all of Japan

[73] Assignee: Hitachi, Ltd., Tokyo, Japan

[21] Appl. No.: 842,547

[22] Filed: Feb. 27, 1992

[30] Foreign Application Priority Data

Feb. 27, 1991 [JP] Japan .................. 3-032612

[51] Int. Cl.⁶ .............................. G11B 5/02
[52] U.S. Cl. .................. 360/19.1; 360/18; 360/27
[58] Field of Search ........... 360/19.1, 48, 40, 27, 360/18; 358/343, 341

[56] References Cited

U.S. PATENT DOCUMENTS

| | | |
|---|---|---|
| 4,758,904 | 7/1988 | Takahashi et al. .............. 360/19.1 |
| 4,791,497 | 12/1988 | Nakano et al. ..................... 360/48 |
| 4,794,474 | 12/1988 | Dwyer et al. ..................... 360/27 X |
| 5,016,120 | 5/1991 | Okada et al. .................. 360/19.1 X |
| 5,132,807 | 7/1992 | Takimoto et al. ............. 358/341 X |
| 5,210,659 | 5/1993 | Oguri et al. ..................... 360/27 |

*Primary Examiner*—Aristotelis Psitos
*Assistant Examiner*—Jennifer Pearson
*Attorney, Agent, or Firm*—Antonelli, Terry, Stout & Kraus

[57] ABSTRACT

A recording method is provided for a video tape recording apparatus having modes for recording PCM audio signals in a plurality of transmission rates. Index codes for a video signal, which enable a search reproduction and so on, are recorded on a video tape in a constant transmission rate irrespective of the transmission rate of a PCM audio signal to be recorded. Further, an amble pattern at the same frequency as the transmission rate of the PCM audio signal is recorded immediately behind the PCM signal recording area. A reproducing apparatus may be provided only with an index detecting circuit corresponding to the constant transmission rate.

10 Claims, 5 Drawing Sheets

FIG. 6
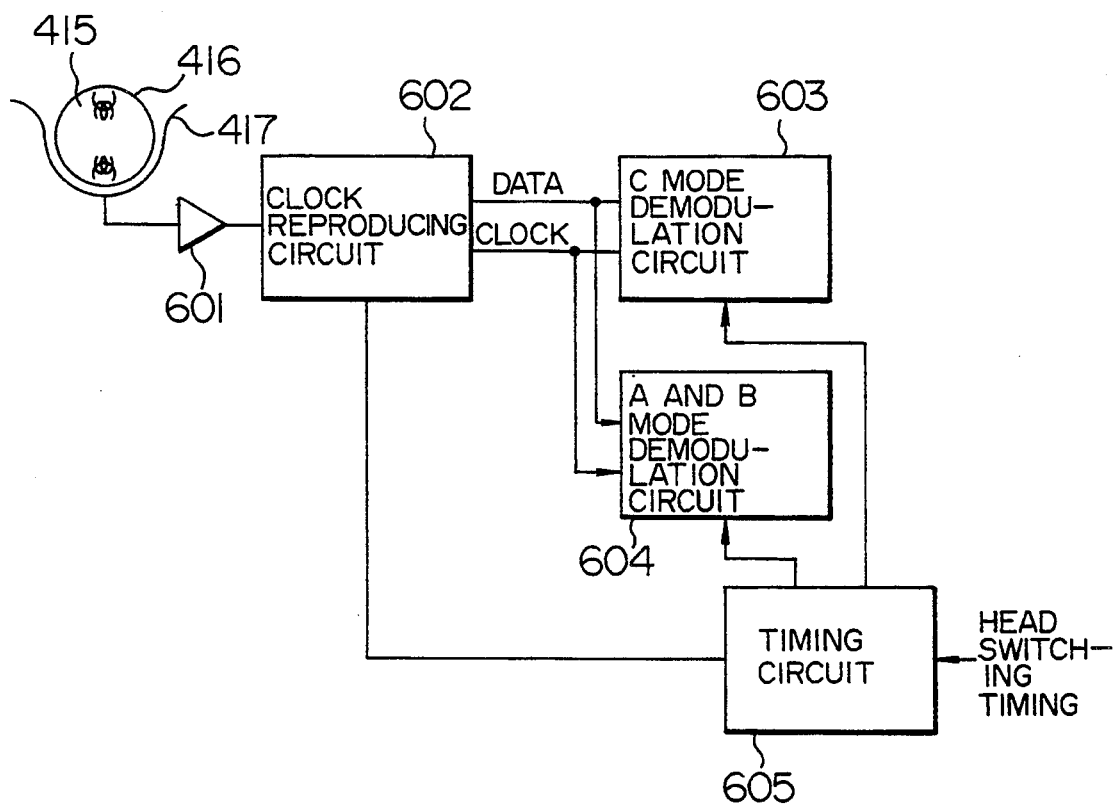
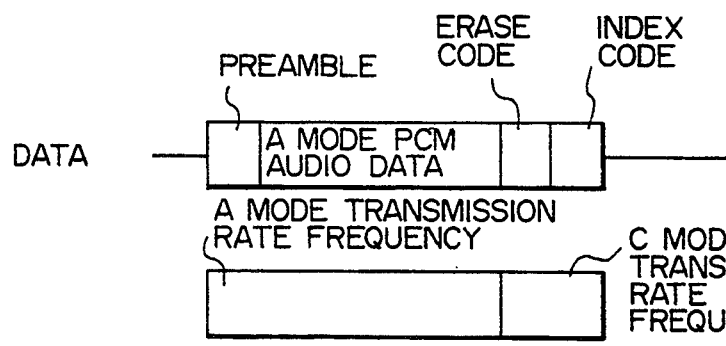
FIG. 7A
FIG. 7B
FIG. 7C
FIG. 7D

PCM SIGNAL RECORDING METHOD AND APPARATUS CAPABLE OF ADDING INDEX CODE TO PCM SIGNAL RECORDED AT DIFFERENT TRANSMISSION RATES

BACKGROUND OF THE INVENTION

The present invention relates to a PCM signal recording technique, and more particularly to a method and apparatus for recording PCM audio signals on a VTR recording medium, such as a magnetic tape, in a plurality of different transmission rates.

In the 8-mm VTR, widely used is an apparatus which quantizes an audio signal in 10-bit units, compresses this 10-bit signal to an 8-bit PCM signal, and records the 8-bit PCM signal.

A conventional 8-mm VTR apparatus, such as described in JP-A-64-86304, provides an index area between a postamble area and a video-PCM guard (V-P guard) band area, and records therein index codes, called video subcodes, including a search signal used for reproducing a video signal, a recording date, an absolute position, a program number and so on, so as to permit a starting position detection for a search replay.

On the other hand, as a PCM audio signal, a PCM signal quantized in 16-bit units is compressed, depending on the kind of a magnetic tape, to reduce the data amount, and is recorded on the magnetic tape by changing the transmission rate, as described in U.S. Pat. No. 4,961,204 issued to Tanaka et al and JP-A-1-276471. The 8-mm VTR thus handles PCM signals at three different transmission rates.

The above-mentioned conventional apparatus for recording a 10-bit quantized PCM signal records index codes at the same transmission rate as that of a 10-bit quantized PCM signal, and does not consider compatibility with an apparatus for recording PCM signals in a plurality of transmission rates, so that the index codes cannot be added to a 16-bit quantized PCM signal having a different transmission rate from that of the 10-bit quantized PCM signal.

SUMMARY OF THE INVENTION

It is an object of the present invention to provide a method and apparatus for recording a signal on a video recording medium, such as a magnetic tape, which is capable of adding index codes for a video signal to a postamble area compatibly for PCM audio signals to be recorded at a plurality of transmission rates.

To achieve the above object, according to one aspect of the present invention, mode for recording a 16-bit quantized PCM audio signal or in a mode for recording a 10-bit quantized PCM audio signal, an index area is provided between a PCM audio signal area and a video signal area on a recording surface of a video tape for recording index codes for a video signal at the same transmission rate as the transmission rate for recording a 10-bit quantized PCM audio signal.

According to another aspect of the present invention, a postamble area is added between the index area and the PCM signal recording area for recording a postamble signal having the same transmission rate as the PCM signal.

Since index codes are recorded in the same area and at the same transmission rate as the transmission rate for recording a 10-bit quantized PCM signal in both of the mode for recording a 10-bit quantized PCM signal and the mode for recording a 16-bit quantized PCM signal, the index codes are reproduced at a constant transmission rate from any tape in the same manner irrespective of the transmission rate at which the PCM signal has been recorded thereon, whereby the index codes for video signals associated with different transmission rates can be detected by a single or common detection circuit.

Also, by use of the postamble area added immediately behind the PCM signal recording area, a reproducing clock for reproducing the PCM signal at an associated transmission rate can be derived while the postamble area is being reproduced, even after PCM data has been reproduced. Since a timing margin is thus ensured upon reproducing PCM data from a tape, the PCM data can be correctly reproduced until the end thereof.

BRIEF DESCRIPTION OF THE DRAWINGS

FIG. 6 is a block diagram illustrating an example of a reproducing circuit for reproducing a PCM audio signal and a video signal from a video tape on which signals have been recorded according to the present invention; and FIG. 7(A–D) is a diagram used for explaining the operation of the reproducing circuit shown in FIG. 6.

DESCRIPTION OF THE PREFERRED EMBODIMENTS

Figure 2:
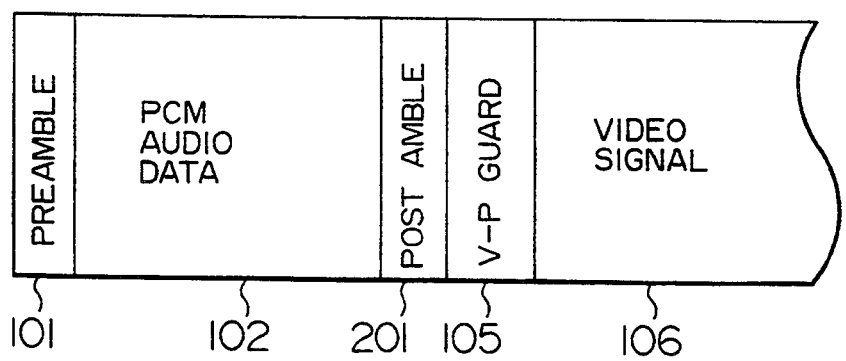
FIG. 2 is a diagram illustrating in detail a conventional track format.
Figure 3:
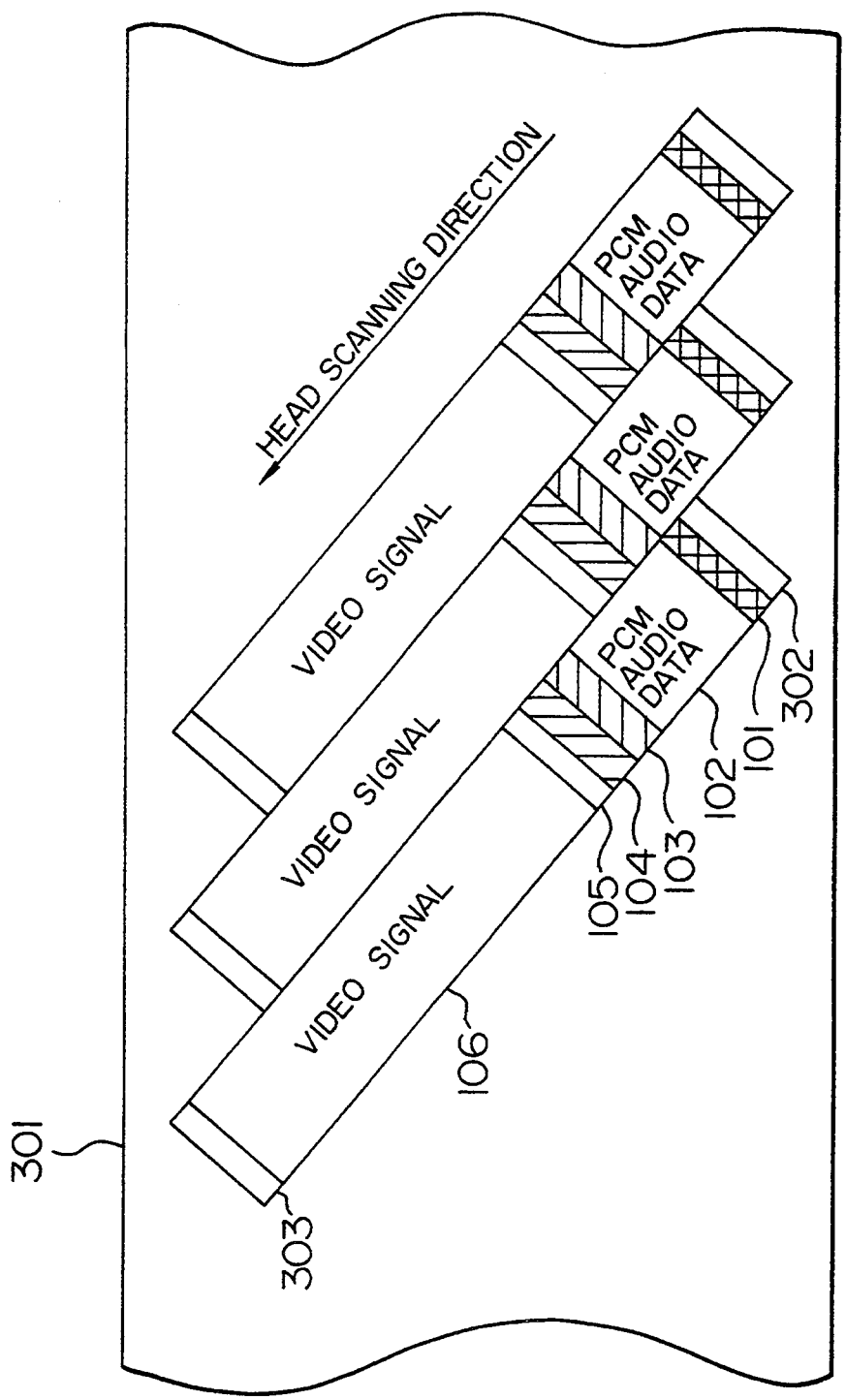
FIG. 3 is a diagram illustrating the track format in its entirety.

One embodiment of the present invention will be described with reference to FIGS. 1, 2 and 3. In the following explanation of all embodiments, it is assumed, for the purpose of illustration, that the VTR for recording a PCM audio signal and a video signal in accordance with the NTSC standard is a PCM audio recording video system operating in three modes, i.e., an A mode for recording 16-bit quantized data, a B mode for recording 12-bit compressed data of 16-bit quantized data, and a C mode for recording 8-bit compressed data of 10-bit quantized data. The transmission rates used in the assumed system are 16.615 Mbps in the A mode, 13.217 Mbps in the B mode, and 11.580 Mbps in the C mode.

Figure 1:
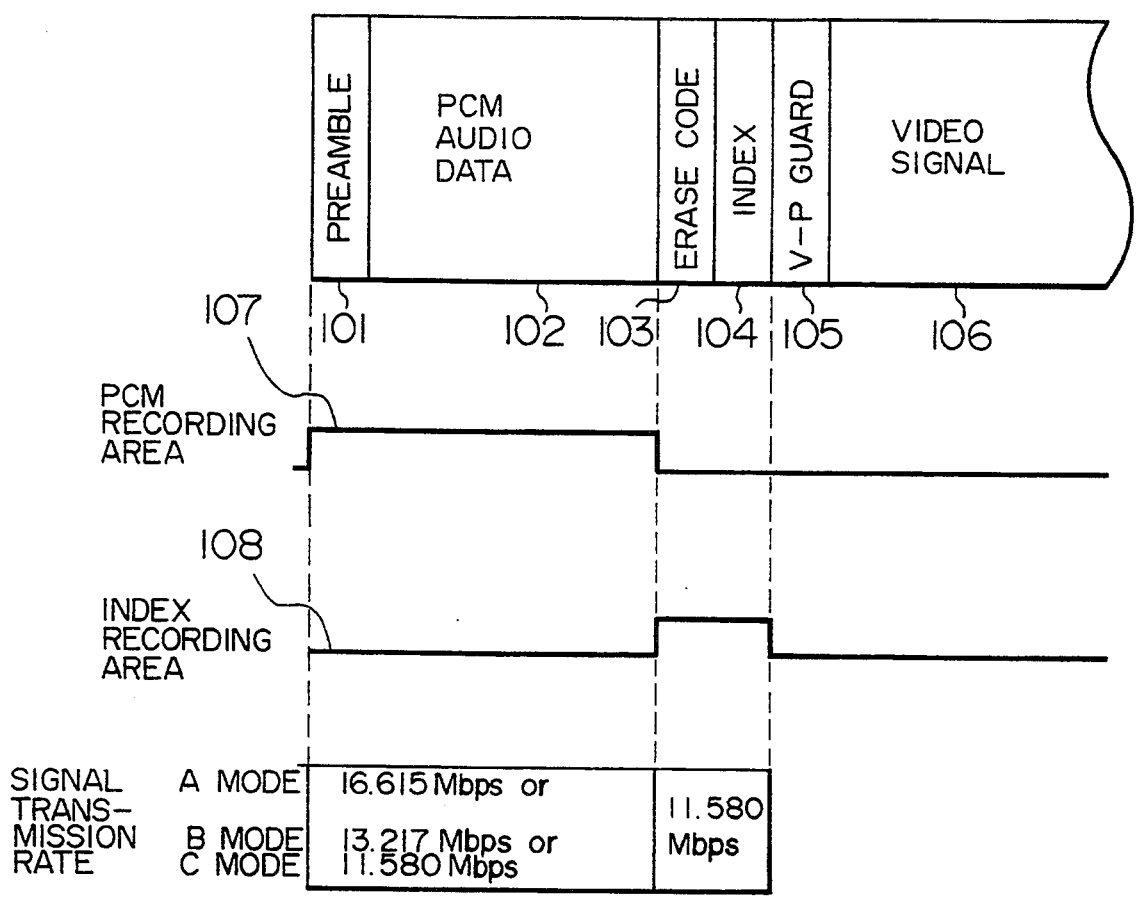
FIG. 1 is a diagram illustrating in detail a track format according to the present invention.

FIG. 1 illustrates a detailed track format according to a recording method of the present invention; FIG. 3 shows the entire track format on a magnetic tape according to the recording method of the present invention; and FIG. 2 shows a detailed track format according to a recording method of the prior art. In FIG. 1, a preamble positioned at the head of an audio signal recording area is a signal of a single frequency, and PCM audio data 102 is PCM data including an audio signal error correcting code and control codes. Index codes 104 include a search signal for reproducing a video signal, a recording date, an address representing an absolute address and control codes, such as a program number. An erase code 103 is a single repetitive signal for enabling overwriting of the index codes 104. The track format also includes a video signal recording area 106, and a V-P guard 105 for separating a PCM signal including the index codes 104 from the video signal 106. The erase code 103 and the index codes 104 are recorded in a part of an area corresponding to a postamble area 201 and a V-P guard 105 of the conventional format shown in FIG. 2. The postamble area 201 also records a signal of a single frequency. FIG. 3 illustrates the whole positional relationship of the track format shown in FIG. 1 on a recording tape which is scanned by a pair of rotary heads. In FIG. 3, reference numeral 301 designates a magnetic tape, and 302, 303 are margin areas in which no signals are recorded. Upon recording, the rotary heads scan and record the respective tracks shown in FIG. 3 in the direction indicated by the arrow.

The recording is performed by the following processings. First, the PCM recording area signal 107, indicating an area in which the preamble 101 and PCM audio data are to be recorded, and an index recording area signal 108, indicating an area in which the erase code 103 and the index code 104 are recorded, are generated. In the PCM recording area indicated by the PCM recording area signal 107, recording is performed in accordance with a predetermined recording mode at a transmission rate selected from 16.615 Mbps for the A mode, 13.217 Mbps for the B mode, and 11,580 Mbps for the C mode. Next, in the recording area indicated by the index recording area signal 108, the erase code 103 and the index code 104 are recorded at the constant transmission rate of 11.580 Mbps, irrespective of the selected recording mode for the recorded PCM audio signal. Incidentally, the PCM recording area signal 107 and the index recording area signal 108 may be readily generated by a known method, i.e., by measuring a time from a reference timing which is synchronized with the rotation of the cylinder on which the recording heads are mounted.

According to this embodiment, the erase and index codes are recorded at a constant transmission rate irrespective of the transmission rate of the recorded PCM audio signal, even in a recording apparatus having modes for recording PCM audio signals at a plurality of different transmission rates. When data is reproduced from the thus recorded magnetic tape, it is not necessary to provide a plurality of index code detecting circuits corresponding to the plurality of transmission rates or recording modes. Instead, the index codes can be detected only by providing a single index code detecting circuit.

Figure 4:
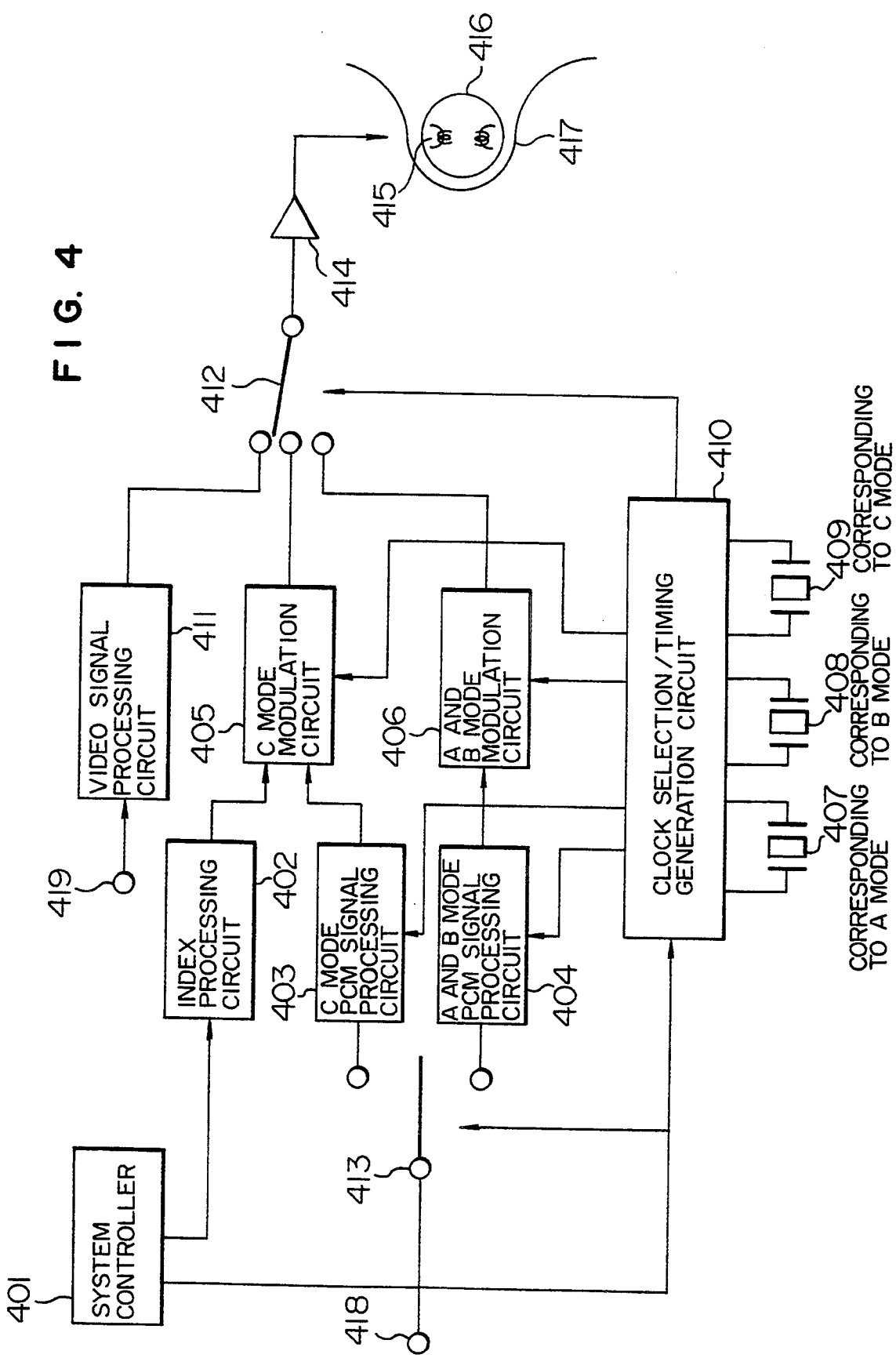
FIG. 4 is a block diagram illustrating a PCM signal recording apparatus according to the present invention.

Next, the embodiment of the present invention will be described with reference to FIG. 4. FIG. 4 is a block diagram illustrating an example of a recording apparatus according to the present invention. In FIG. 4, reference numeral 401 designates a system controller for controlling the whole system, 402 an index processing circuit for processing inputted index codes in accordance with a predetermined format, 404 an A and B mode PCM signal processing circuit for performing addition of an error correcting code, scrambling of data and so on in the foregoing A mode or B mode, 403 a C mode PCM signal processing circuit for performing addition of an error correcting code, scrambling of data and so on in the foregoing C mode, 406 an A and B mode modulation circuit for performing modulation in accordance with each of the A mode and B mode, 405 a C mode modulation circuit for performing modulation in accordance with the C mode, 407 a quartz oscillator for generating a clock signal corresponding to the transmission rate of the A mode, 408 a quartz oscillator corresponding to the transmission rate of the B mode, 409 a quartz oscillator corresponding to the transmission rate of the C mode, 410 a clock selection and timing generation circuit for selecting a clock and generating a timing in accordance with a selected mode, 411 a video signal processing circuit for processing a video signal, 412 and 413 switch circuits respectively operated by the system controller 401 and a switch signal from the timing generation circuit 410, 414 a recording amplifier, 415 a pair of magnetic heads, 416 a rotary cylinder, 417 a magnetic tape, 418 a PCM signal input terminal, and 419 a video signal input terminal to which there is applied a video signal to be recorded.

Next, description will be made as to the recording operation of the above system. A PCM signal inputted from the PCM signal input terminal 418 is delivered through the switch circuit 413 to the C mode PCM signal processing circuit 403 when it is to be recorded in the C mode or to the A and B mode PCM signal processing circuit 404 when it is to be recorded in the A or B mode. The switch circuit 413 is controlled by the system controller 401. A control signal generated from the system controller 401, in turn, is reordered by the index processing circuit 402 in accordance with an index code format. The index processing circuit 402 also generates data for an erase pattern which is formed of a repetition of a single frequency in proportion to the index transmission rate. The index processing circuit 402 further adds a code for detecting index errors. The PCM audio signal, after having been subjected to addition of an error correcting code thereto, the scrambling of data in accordance with a recording format and so on in the PCM signal processing circuits 403 or 404, is delivered, during a period corresponding to the PCM recording area 107 shown in FIG. 1, from the C mode PCM signal processing circuit 403 to the C mode modulation circuit 405 when recorded in the C mode, or from the A and B mode PCM signal processing circuit 404 to the A and B mode modulation circuit 406 when recorded in the A or B mode. Data modulated by the modulation circuit 405 or 406 is inputted through the switch circuit 412 to the recording amplifier 414 and thereafter is recorded on the magnetic tape 417 through the magnetic heads 415 mounted on the rotary cylinder 416. In this event, the clock selection and timing generation circuit 410 performs the following processings:

1) Generates the PCM recording area signal 107 shown in FIG. 1 based on a timing synchronized with the rotation of the rotary cylinder 416.

2) Supplies the modulation circuit 405 or 406 with a clock signal having a frequency corresponding to the transmission rate for the PCM signal recording in each recording mode. Explaining with an example, the A and B mode modulation circuit 406 is supplied with a clock signal at 16.615 Mbps from the quartz oscillator 407 during A mode recording, the A and B mode modulation circuit 406 is supplied with a clock signal at 13.217 Mbps from the quartz oscillator 408 during B mode recording, and the C mode modulation circuit 405 is supplied with a clock signal at 11.580 Mbps from the quartz oscillator 409 during C mode recording.

3) The timing generation circuit 410 controls the switch circuit 412 in the following manner. During a period indicated by the PCM recording area signal 107 of FIG. 1, the timing generation circuit 410 has the switch circuit 412 select the A and B mode modulation circuit 406 when a PCM signal is to be recorded in the A mode or B mode, while the C mode modulation circuit 405 is selected when the recording is to be performed in the C mode. The index codes and the erase code processed by the index processing circuit 402 in turn are delivered to the C mode modulation circuit 405 to be modulated during a period corresponding to the index recording area 108 of FIG. 1. The modulated data is inputted to the recording amplifier 414 through the switch circuit 412 during the period indicated by the index recording area 108 and thereafter is recorded on the magnetic tape 417 through the magnetic heads 415 mounted on the rotary cylinder 416.

Explaining the above event in greater detail, the clock selection and timing generation circuit 410 performs the following processings:

1) Generates the index recording area signal 108 shown in FIG. 1 based on a timing synchronized with the rotation of the rotary cylinder 416.

2) Supplies the C mode modulation circuit 405 with a clock signal at 11.580 Mbps, that is, the clock signal corresponding to the transmission rate for the length of the period indicated by the index recording area signal 108.

3) Simultaneously controls the switch circuit 412 so as to select the C mode modulation circuit 405 during the period indicated by the index recording area signal 108 shown in FIG. 1 to output the index signal to be recorded.

Figure 5:
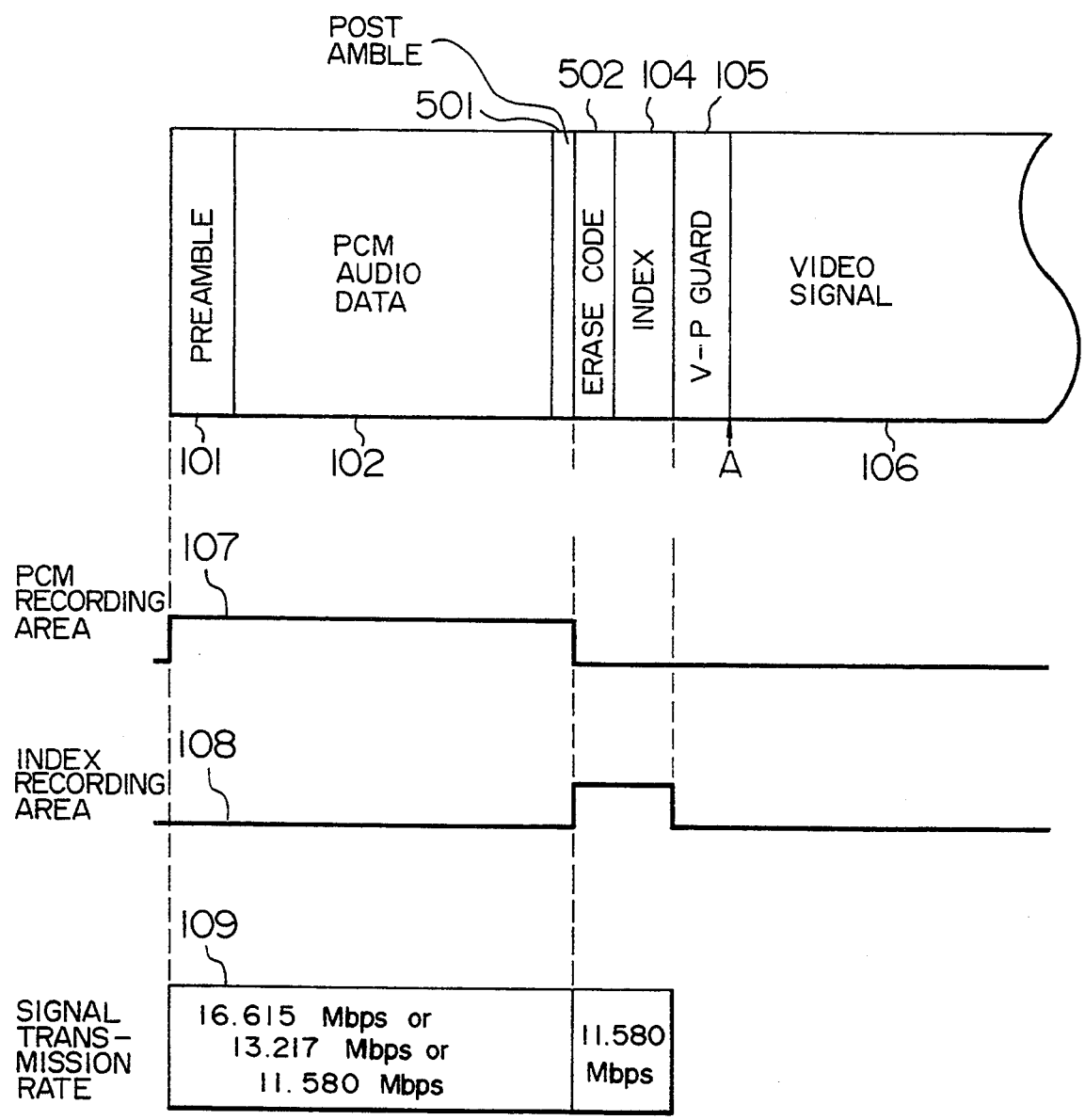
FIG. 5 is a diagram illustrating in detail a track format according to the present invention.

Next, another embodiment of the present invention will be described with reference to FIG. 5. FIG. 5 illustrates a track format according to another recording method of the present invention.

In FIG. 5, reference numeral 101 designates a preamble, 102 a PCM audio data area (recording area), 501 a postamble area having the same single frequency as the transmission rate of the PCM audio data, 104 an index code area, 502 an erase code area for a single repetitive pattern for allowing the index codes to be overwritten, 105 a V-P guard area, and 106 a video signal recording area. The respective areas of the preamble 101, the PCM audio data 102, the index codes 104, the V-P guard 105, and the video signal 106 are arranged on the track in the same positional relationship as that of the track format shown in FIG. 1. Also, the area comprising the postamble 501 and the erase code 502 is equal to the erase code area 103 of FIG. 1 in view of the whole positional relationship.

In the format shown in FIG. 5, recording is realized by the following processings. First, a PCM recording area signal 107, indicating an area in which the preamble 101, the PCM audio data 102 and the postamble 501 are recorded, and an index area signal 108, indicating an area in which the erase code 502 and the index codes 104 are recorded, are generated. In a PCM recording period indicated by the PCM recording area signal 107, the preamble signal 101, the PCM audio data 102 and the postamble 501 are recorded at a transmission rate selected from 16.615 Mbps, 13.217 Mbps and 11.580 Mbps in accordance with a required recording mode. Next, in an index recording period indicated by the index recording area signal 108, the erase code 502 and the index codes 104 are recorded at a constant transmission rate, for example, 11.580 Mbps, irrespective of the required recording mode. In a manner similar to the embodiment explained in connection with FIG. 1, the PCM recording area signal 107 and the index recording area signal 108 may be readily generated by measuring a time from a reference timing synchronized with the rotation of the cylinder on which the pair of recording heads are mounted.

Next, explanation will be given of numerical examples of the postamble signal 501, the erase code 502, the index codes 104 and the V-P guard 105 for the embodiment shown in FIG. 5. Assume in the following explanation that reference letter H designates the length of an area corresponding to one horizontal synchronization period of a video signal, and the lengths of the respective areas are expressed with "H" as the unit. First, as standard values, the postamble area is determined to be 0.1 H long, the erase code area 2.6 H, the index code area 1.8 H, and the V-P guard area 2.3 H. The total length of the five areas, that is, the area between the PCM audio data 102 and the video signal 106 is 6.8 H. By establishing the area lengths in the above manner, no inconvenience will occur even if the following variations of apparatus are taken into consideration. The variations to be considered to be tolerable are the recording position accuracy of the PCM audio data 102 lying within +0.8 H, and the recording position accuracy of the video signal 106 within +1.5 H. In this case, the length of the area between the PCM audio data 102 and the video signal 106 is 6.8H+2.3 H. The recording area for the erase code 502 is assumed to be a variable area extending from the end of the postamble area 501 to a position 4.1 H before a head switching point. (The head switching point refers to a timing at which signals reproduced from the two opposed magnetic heads 415 spaced by 180° are switched in order to produce a single sequential signal from these signals.) This assumption ensures the respective areas included between the PCM audio data area and the video signal 106 as follows even in the following worst cases:

(a) The region between the PCM audio data area 102 and the video signal area 106 extends over 6.8 H–2.3 H:

| 1) Preamble | 0.1H |
|---|---|
| 2) Erase code | 2.6H − 0.8H |
| 3) Index code | 1.8H |
| 4) V-P guard | 2.3H − 1.5H |

(b) The region between the PCM audio area data 102 and the video signal area 106 extends over 6.8 H+2.3 H:

| 1) Preamble | 0.1H |
|---|---|
| 2) Erase code | 2.6H + 0.8H |
| 3) Index code | 1.8H |
| 4) V-P guard | 2.3H + 1.5H |

According to the embodiment shown in FIG. 5, since the postamble signal is recorded immediately behind the PCM audio signal at the same transmission rate as that of the PCM audio signal, a clock signal at a frequency equal to the transmission rate of the PCM audio signal can be reproduced while the postamble signal is reproduced from the magnetic tape 417 during reproducing of the PCM audio signal. A PCM audio signal processing circuit therefore can continuously supply a clock signal at the transmission rate of the PCM audio signal reproduced from the postamble signal until the last data of the PCM audio signal has been processed, thereby making it possible to correctly reproduce the data until the last of the PCM audio signal.

Next, an example of a circuit for reproducing a PCM audio signal and a video signal recorded on a magnetic tape in accordance with the above described embodiment will be described with reference to FIGS. 6 and 7A-7D. FIG. 6 is a block diagram of a reproducing circuit for reproducing a PCM audio signal and index codes for a video signal, and FIGS. 7A-7B are timing charts showing operation timings of the reproducing circuit shown in FIG. 6 when a PCM audio signal is recorded in the A mode. The transmission rate of the preamble signal and A mode PCM audio data is determined to be 16.615 Mbps and that of the erase code 103 and the index codes 104 is 11.580 Mbps. In FIG. 6, reference numeral 415 designates a pair of magnetic heads, 416 a rotary cylinder, 417 a magnetic tape, 601 a reproducing amplifier, 602 a clock signal reproducing circuit for reproducing from a reproduced signal a clock signal synchronized with the reproduced signal, 603 a demodulation circuit for demodulating a PCM audio signal and the index codes 104 recorded at the transmission rate of the C mode, 604 a demodulation circuit for demodulating a PCM audio signal recorded in the A mode or B mode, and 605 a timing circuit for generating, based on a head switching timing, a switch control signal to the clock signal reproducing circuit as well as an operation enable timing signal to the demodulation circuits 603, 604. The head switching timing (FIG. 7D) is based on a switching signal for switching the two opposed magnetic heads 415 spaced by 180° so as to produce a single sequential signal from signals reproduced from these magnetic heads, and this switching signal is generated by a servo circuit for control of the rotary heads, not shown in FIG. 6.

Next, description will hereinbelow be made as to the operation of reproducing a PCM audio signal which has been recorded in the A mode. Signals detected by the magnetic heads 415 are delivered through the reproducing amplifier 601 to the clock signal reproducing circuit 602. The clock signal reproducing circuit 602 detects "1" and "0" states of the reproduced data using a reproduced clock signal, and outputs the detected data together with the reproduced clock signal. The clock signal reproducing circuit 602 may be constituted of an ordinary phase locked loop (PLL). In the present embodiment, since signals at different transmission rates are processed, the central frequency of the PLL is switched for each transmission rate. The clock signal reproducing circuit 602 therefore switches the central frequency of the PLL in accordance with a switching timing shown in FIG. 7B to handle and supply the detected data and transmission clock signal synchronized with the data to the C mode demodulation circuit 603 and the A and B mode demodulation circuit 604. The A and B mode demodulation circuit 604 demodulates an A mode PCM audio signal during an A mode period in FIG. 7C in accordance with an operation enable timing from the timing circuit 605, while the C mode demodulation circuit 603 demodulates the index codes 104 during a C mode period in FIG. 7C in accordance with the operation enable timing from the timing circuit 605. When a recorded PCM audio signal is in the B mode, the only difference which appears is that the A and B mode demodulation circuit 604 demodulates the PCM audio signal in the B mode. It will be thus appreciated that the index codes for a video signal recorded in accordance with the present invention can be detected by a single detecting circuit, i.e., the C mode demodulation circuit 603.

What is claimed is:

1. A method of recording a PCM audio signal and index codes in a single continuous scanning on a recording medium comprising the steps of:
   recording said PCM audio signal in a predetermined first region on the recording medium at a first transmission rate which is selected from plural transmission rates; and
   recording index codes representing video subcodes in a second region of the recording medium different from said first region at a constant second transmission rate independent of said first transmission rate.

2. The recording method according to claim 1 further including the step of recording a postamble signal in the form of a single repetitive signal at the same transmission rate as said first transmission rate in a third region of the recording medium provided between said first region and said second region.

3. An apparatus for recording a video signal, index codes representing video subcodes and a PCM audio signal in a single continuous scanning on a recording medium, comprising:
   means for recording said PCM audio signal in a predetermined first region and said video signal in a second region behind said first region on the recording medium at a first transmission rate which is selected from plural transmission rates; and
   means for recording index codes representing video subcodes in a third region between said first and second regions at a constant second transmission rate without regard to said first transmission rate.

4. A recording apparatus according to claim 3 further including means for recording a postamble signal in the form of a single repetitive signal at the same transmission rate as said first transmission rate in a fourth region immediately behind said first region.

5. A method according to claim 1, wherein said index codes identify a program starting position, a recorded date, an absolute position and a program number.

6. A method according to claim 1, wherein said constant second transmission rate is one of said plural transmission rates.

7. A method for recording a video signal, index codes and a PCM audio signal in a single continuous scanning on a recording medium comprising the steps of:
   recording a video signal in a region of said recording medium;
   selecting a first transmission rate from plural transmission rates;
   generating a first clock signal of a first frequency;
   recording said PCM audio signal in a predetermined first region on the recording medium at said selected first transmission rate using said first clock signal;
   generating a second clock signal, the frequency of which is independent of said first frequency; and
   recording index codes representing video subcodes in a second region on the recording medium different from said first region at a constant second transmission rate independent of said first transmission rate using said second clock signal.

8. A method according to claim 7 further including the step of recording a postamble signal in the form of a single repetitive signal at the same transmission rate as said first transmission rate in a third region of the recording medium provided between said first region and said second region using said first clock.

9. A method according to claim 7, wherein said constant second transmission rate is one of said plural transmission rates.

10. A method according to claim 7, wherein said first transmission rate is selected from 16.615 Mbps, 13.217 Mbps and 11.580 Mbps, and said second transmission rate is 11.580 Mbps.

* * * * *